United States Patent [19]
Adachi et al.

[11] Patent Number: 5,860,401
[45] Date of Patent: Jan. 19, 1999

[54] BONDED VALVE SEAT AND METHOD

[75] Inventors: Shuhei Adachi; Junichi Inami, both of Iwata, Japan

[73] Assignee: Yamaha Hatsudoki Kabushiki Kaisha, Iwata, Japan

[21] Appl. No.: 804,456

[22] Filed: Feb. 25, 1997

[30] Foreign Application Priority Data

Mar. 5, 1996 [JP] Japan ................................. 8-047657

[51] Int. Cl.$^6$ .............................. C23C 28/02; F16K 1/42
[52] U.S. Cl. ...................................................... 123/188.8
[58] Field of Search ............................ 123/188.8, 188.3, 123/188.14, 193.5; 251/359, 340, 362, 364

[56] References Cited

U.S. PATENT DOCUMENTS

| | | |
|---|---|---|
| 3,766,633 | 10/1973 | Lehrheuer . |
| 4,723,518 | 2/1988 | Kawasaki et al. ................. 123/188.8 |
| 4,791,259 | 12/1988 | Pfaffmann ......................... 123/188.8 |
| 4,831,976 | 5/1989 | Pozniak et al. . |
| 4,896,638 | 1/1990 | Shepley . |
| 5,586,530 | 12/1996 | Adachi et al. .................... 123/188.8 |

FOREIGN PATENT DOCUMENTS

| | | |
|---|---|---|
| 0092081 | 10/1983 | European Pat. Off. . |
| 743428 | 11/1996 | European Pat. Off. . |
| 4409451 | 9/1995 | Germany . |
| 1150005 | 4/1969 | United Kingdom . |

OTHER PUBLICATIONS

European Search Report dated Jul. 8, 1997.

*Primary Examiner*—Marguerite McMahon
*Attorney, Agent, or Firm*—Knobbe, Martens, Olson & Bear LLP

[57] ABSTRACT

An improved method of metallurgically bonding two dissimilar materials to form, for example, a valve seat for an internal combustion engine. The bonding process is coupled by pressing pressure and the application of heat. The process is controlled so that the temperature of the lower melting point material never exceeds its solidus temperature but is close to it. Plastic deformation occurs in the base material but the base material is not liquefied.

4 Claims, 11 Drawing Sheets

Distance From Interface

BONDED VALVE SEAT AND METHOD

BACKGROUND OF THE INVENTION

This invention relates to a method of bonding dissimilar metals and the resulting structure therefrom and more particularly to an improved method for forming a valve seat for a reciprocating machine such as an engine and the resulting valve seat.

In many instances, it is the practice to form a component of a mechanism from dissimilar metals. This technique is resorted to so as to take the advantages of the individual properties of the two dissimilar materials in their specific locations. For example, it may be desirable to form components of a mechanism such as an engine from a lightweight material such as aluminum or an aluminum alloy. However, this type of material has certain wear disadvantages. Therefore, in areas of high wear, it is a practice to utilize a material that is somehow fixed to the base aluminum material, but which has more wear resistant characteristics.

A specific example of such an arrangement is the cylinder head of an engine. In the cylinder head, an aluminum alloy is frequently used as the base casting material because of the higher heat conductivity and lighter weight of the base aluminum alloy. However, in areas where wear is likely to incur, such as the valve seats, a harder, more wear resistant material is employed. Frequently, sintered iron or other similar materials are utilized to form the valve seats of the engine.

Figure 1:
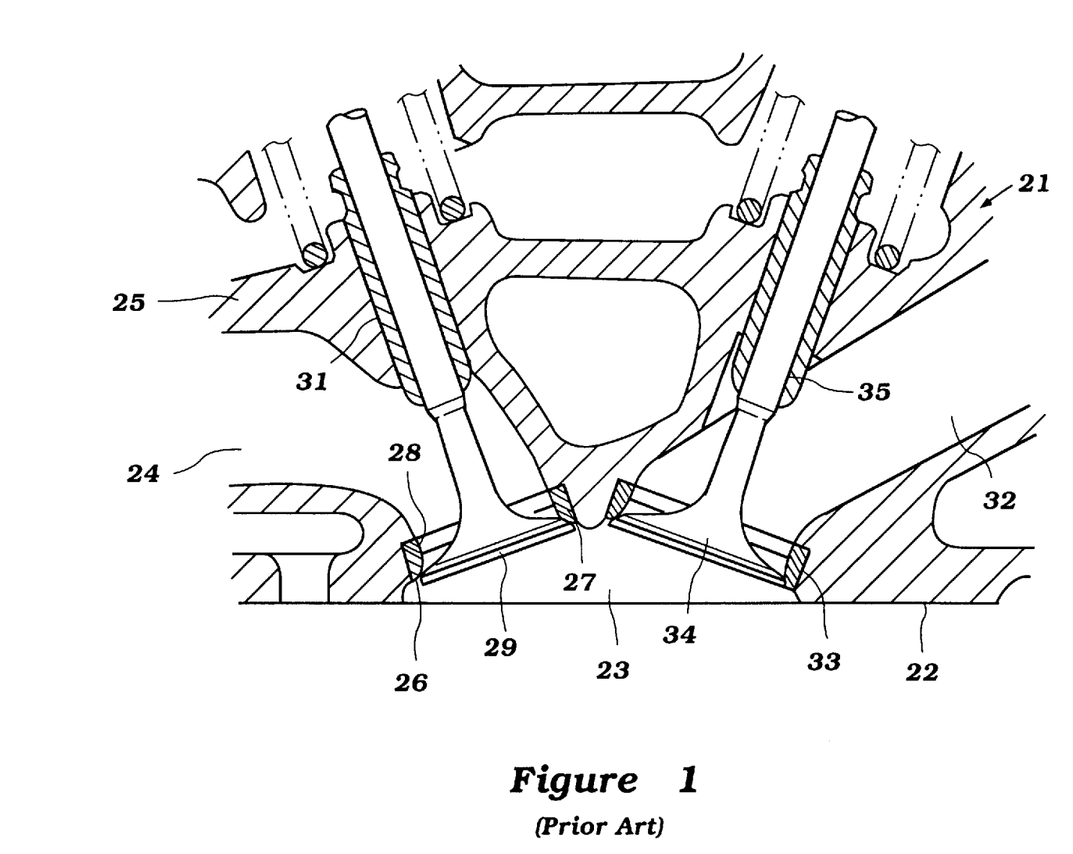
FIG. 1 is a cross-sectional view taken through a portion of a cylinder head having a conventional prior art pressed-in valve seat insert arrangement.

This gives rise to a problem in adhering the sintered iron valve seat to the aluminum alloy body of the cylinder head. Frequently, a press-fit arrangement is employed for forming such joints and FIG. 1 illustrates a section through a cylinder head having a press fit valve seat utilizing these two materials. The disadvantages of this type of construction will be described by particular reference to this figure after the basic structure of the cylinder head is described in conjunction with the figure.

In FIG. 1, a cylinder head assembly is indicated generally by the reference numeral 21. Only a portion of the cylinder head assembly 21 is illustrated because the invention deals, as aforenoted, primarily with the connecting arrangement between the valve seat inserts and the base cylinder head material. Therefore, a cross-sectional view taken through a portion of the cylinder head that forms a portion of the combustion chamber will permit those skilled in the art to understand the problems associated with this basic type of prior art construction.

The cylinder head 21 has a lower sealing surface 22, that is adapted to be brought into sealing engagement with a cylinder block which is not shown so as to form a closure for the cylinder bores at one end thereof. The surface 22 is interrupted by recesses 23 which cooperate with the cylinder bores and associated pistons to form the combustion chambers of the engine.

One or more exhaust ports 24 extend through one side of the base cylinder head material 25 and terminate in valve seats, indicated generally by the reference numeral 26. Each valve seat 26 is comprised of a generally cylindrical machined recess 27 formed in the cylinder head material 25 and into which is pressed a valve seat insert 28. Typically, the material of the cylinder head casting 25 will be aluminum or an aluminum alloy, while the valve seat insert 28 will be formed from a material that is harder and more wear-resistant, such as a sintered iron or the like.

A valve 29 is supported in a valve guide 31 in the cylinder head and is operated by a suitable actuating mechanism of any known type for opening and closing the valve seat 26 in a manner well known in the art.

A further intake passage 32 is formed also in the base cylinder head material 25 and has a valve seat insert 33 formed therein. The valve seat insert 33 is assembled in the same manner as the exhaust valve seat and, therefore, further description of it is not required.

An intake valve 34 is supported in a valve guide 35 in the cylinder head material 25, and is also operated by a suitable valve actuating mechanism.

It should be readily apparent that it is extremely important that the valve seat inserts 26 and 33 must be firmly attached in the cylinder head base material. There is a number of reasons for this. First, it must be ensured that the inserts do not fall out of the cylinder head when the engine is running. This would obviously cause serious damage to the engine.

Therefore, a technique using a force fit has been employed for placing the inserts into the cylinder head. This is accomplished by forming the bores in which the insert rings are placed with a smaller diameter than the outer diameter of the insert ring. The cylinder head is then heated and/or the insert ring is chilled so that the thermal expansion will permit the insert to be forced into the bore of the smaller diameter.

This requires considerable force, and when the materials return to their original temperatures, there will be a compressive force on the insert and a tensile force on the cylinder head, which can result in cracking of one or both of these components.

Furthermore, because of the difference of thermal expansions between the cylinder head material and the insert ring, the force fit must be such that when the engine becomes heated, the higher thermal expansion of the base cylinder head material will not cause the insert ring to become loosened, and fall out of its position. This requires an initial stress that is quite high.

In order to resist this cracking, it is necessary to provide an insert ring that has substantial thickness and also substantial length. This means that the heat transfer between the valves and the base cylinder head material is retarded by the interpositioning of this less thermally conductive material.

Furthermore, because of the sizes required, the configuration of the ports are also dictated in large part by the dimensions of the insert ring.

In addition to all of these disadvantages, the distance between adjacent valve seats must be kept relatively large so as to provide sufficient base cylinder head material between the valve seats to withstand the stresses required by the press fitting. Thus, it is not possible to utilize as large a valve area in the engine as might be desired.

In order to overcome these difficulties, it has been proposed to form some method of more permanently adhering the insert ring material into the base cylinder head material. Such techniques as welding or laser cladding have been proposed. Generally, these techniques require the application of sufficient heat so as to cause a melting to occur between the outer surface of the insert ring material and the inner surface of the cylinder head material. This forms a resulting alloy in the interface that is comprised of a mixture of the materials of the basic cylinder head and of the insert ring.

Although these welding or laser cladding techniques provide a more permanent bond, they do not totally solve the aforenoted problem. For example, because of the melting which occurs, there may be formed gas pockets or cavities in the interface between the two materials. These obviously will reduce not only the strength of the resulting bond, but will also reduce the heat transfer from the valve to the basic cylinder head material.

In addition, the resulting composition of the alloy at the interface can provide both metallurgical and physical properties that are not desirable. The alloy may, in fact, impede the heat transfer, or can reduce the strength or wear resistance of the resulting structure.

Therefore, there have been proposed techniques for forming a metallurgical bond between the insert ring and the cylinder head. The insert ring is pressed into place, and the insert ring and cylinder head material is heated sufficiently so as to form a metallurgical bond between the insert ring and the cylinder head at the interface, without any significant alloying of the two materials. This is also done in such a way that there is not a significant degree of liquification of the materials of either the insert ring or the cylinder head material that would cause voids. The following applications for United States Letters Patent, all of which are assigned to the Assignee hereof, and many of which are invented by the inventors hereof, are examples of methodology and valve seat insert formations that have been proposed so as to solve these problems and which, in fact, do solve these problems:

| Ser. No.   | Filing Date       |
|------------|-------------------|
| 08/278,026 | July 20, 1994     |
| 08/483,246 | June 7, 1995      |
| 08/601,287 | February 16, 1996 |
| 08/607,823 | February 27, 1996 | and others.

It is an object of this invention to provide an improved method of forming a metallurgical bond between two dissimilar metals that will overcome the problems of the prior art and which will offer a further improvement in the resulting strength of the bond from those noted copending applications.

As has been noted, this type of technique is utilized in environments where the resulting structure may be exposed to considerable thermal stresses. It has been found that although high initial bonding strength may result from certain techniques, when the resulting bond has been subjected to high temperatures for a length of time, the bonding strength may deteriorate.

It is, therefore, a further object of this invention to provide an improved bonding method wherein the bonding technique is such that the joint will maintain high strength, even after prolonged periods of operation at high temperatures.

SUMMARY OF THE INVENTION

This invention is adapted to be embodied in a method of metallurgically bonding two metals having substantially different melting points. The method comprises the steps of forming pieces from the two metals and placing those pieces in surface-to-surface contact with each other. A pressure is then applied that tends to cause the pieces to move toward each other. Heat is applied, but the heat application is done in such a way that the temperature of the materials does not exceed the solidus temperature of the material having the lower melting point. This pressing and heating is continued until a metallurgical bond is formed.

Another feature of the invention is embodied in a cylinder head having at least one valve seat formed by the aforenoted method.

BRIEF DESCRIPTION OF THE DRAWINGS

FIGS. 5–10 are a series of cross-sectional views showing the different phases in the bonding technique.

DETAILED DESCRIPTION OF THE
PREFERRED EMBODIMENTS OF THE
INVENTION

Figure 2:
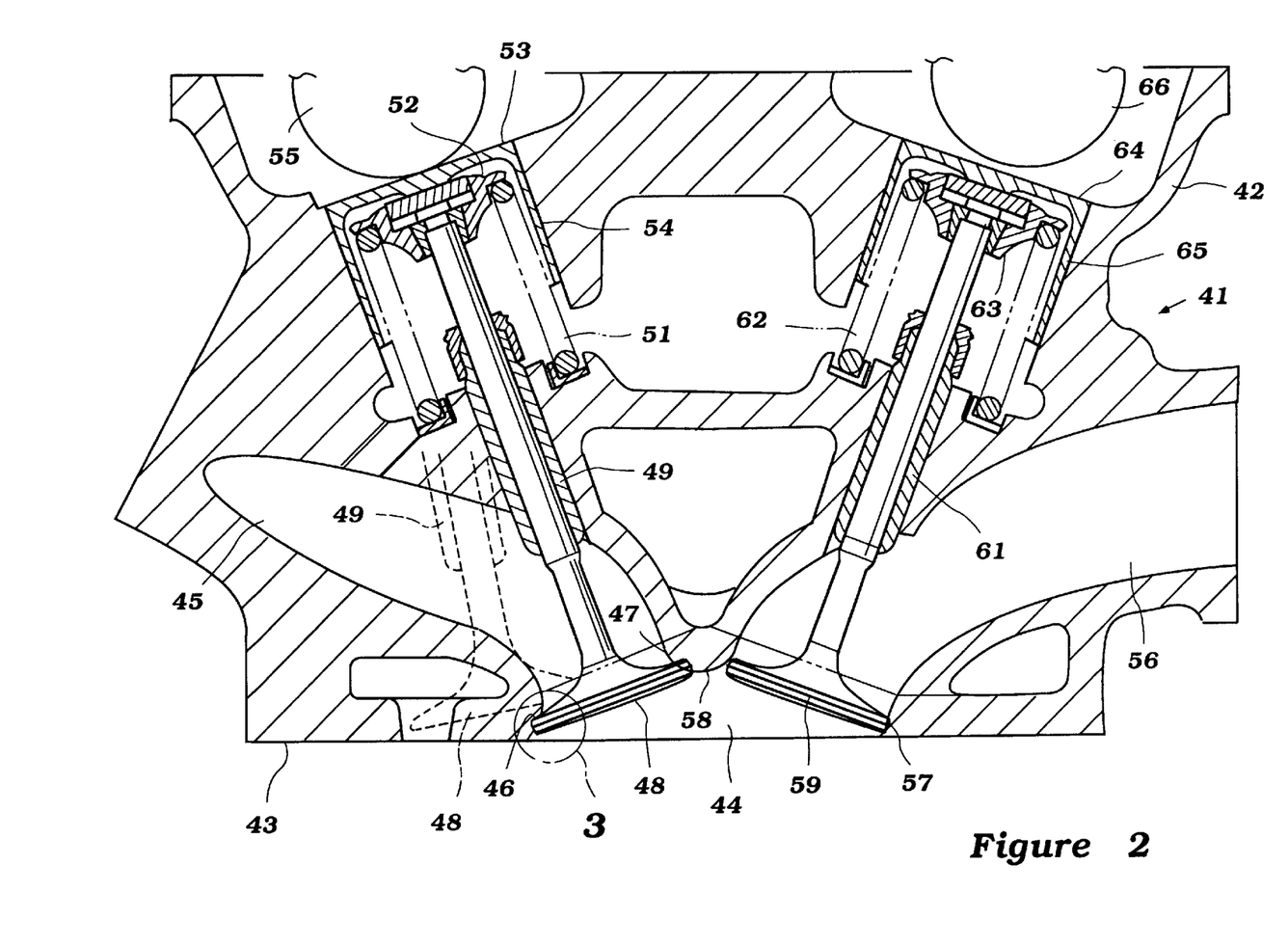
FIG. 2 is a cross-sectional view taken through a cylinder head having a valve seat construction manufactured in accordance with a method embodying the invention.

Referring now in detail first to FIG. 2, this illustrates a cross-sectional view taken through a cylinder head of an internal combustion engine and is, in part, similar to FIG. 1. While FIG. 1 shows an engine having only two or four valves per cylinder, FIG. 2 shows an engine having five valves per cylinder. This is because this invention is particularly adapted for use with multi-valve engines. This is possible because the valve seats formed in conjunction with the invention do not require as much space between adjacent valves because of the manner in which the seat is formed. Therefore, it permits the use of a larger number of valves per cylinder.

Only a cylinder head, indicated generally by the reference numeral 41, is illustrated because, as has been noted, the invention deals primarily with the manner in which the valve seats are formed. The cylinder head 41 includes a base cylinder head casting 42 which may be formed from an aluminum or aluminum alloy. In accordance with certain features of the invention, the basic material or alloy of the cylinder head 42 is preferably chosen from a group comprised of those aluminum alloys known in the Japanese Industrial Standard (JIS) as AC4C, AC4B or AC2B.

It is to be understood, however, that this technique can be utilized with a wide variety of types of materials, and also can be utilized in conjunction with applications other than valve seats for cylinder heads. The invention does have particular utility, however, where dissimilar metals are employed, and specifically where those metals are such that their utilization will experience high heat loading.

The cylinder head body 42 is formed with a lower surface 43 that is held in sealing engagement with an associated cylinder block in closing relationship with cylinder bores formed therein. The surface 43 is formed with recesses 44 (only one of which is shown) which cooperates with the cylinder bores and the pistons therein to form the combustion chambers of the engine.

An intake passage arrangement 45 extends through one side of the cylinder head body 42 and terminates in three valve seats 46 formed in the combustion chamber recess 44 in a manner which will be described. The passage 45 branches into individual ports 47 that terminate at these valve seats 46.

A series of intake valves, each indicated by the reference numeral 48, are slidably supported in valve guides 49 in the cylinder head body 42 for cooperation with these valve seats 46 for opening and closing the communication of the intake ports 47 with the combustion chamber recess 44. Although a wide variety of types of valve placements can be employed, preferably the valve placement is of the type described in U.S. Pat. No. RE 33,787, reissued Jan. 7, 1992, in the name of Masaki Yoshikawa, and assigned to the Assignee hereof. Again however, this is merely one of many types of valve arrangements with which the invention may be utilized.

Valve springs 51 cooperate with keeper retainer assemblies 52 fixed to the upper ends of the stems of the valves 48 for urging them to a closed position in which they seat with the valve seats 46. Thimble-type tappets 53 are supported in bores 54 in the cylinder head body 42. These tappets 53 are operated by an intake camshaft 55 that is appropriately journaled in the cylinder head body 42. This intake camshaft 55 is driven in a known manner from the crankshaft of the engine for opening and closing the valves 48 in the desired time sequence.

A pair of exhaust passages 56 extend through the side of the cylinder head body 42 opposite to the intake passage 45. Valve seats 57, also formed in accordance with the invention as will be hereinafter described, are formed at the termination of these exhaust passages 56. As may be seen, the valve seats 46 and 57 may be positioned quite close together, separated by a small body 58 of the cylinder head body 42. This is because the methodology in conjunction with the invention permits a high bonding strength, and does not place any undue stresses on the base cylinder head material.

Exhaust valves 59 are supported in exhaust valve guides 61 held in the cylinder head body 42. The exhaust valves 59 are urged to a closed seating arrangement with the valve seats 57 by coil compression springs 62. The springs 62 act against the cylinder head and keeper retainer assemblies 63 that are affixed to the upper ends of the stems of the exhaust valves 59.

Thimble tappets 64 are supported in bores 65 formed in the cylinder head body 42. These thimble tappets 64 are operated by an exhaust camshaft 66. The exhaust camshaft 66, like the intake camshaft 55, is rotatably journaled in the cylinder head body 42 in a suitable manner and driven at one-half crankshaft speed.

As has been noted, the aforedescribed construction of the cylinder head 41 has been described so as to prevent those skilled in the art to understand an environment in which the invention can be utilized.

Figure 3:
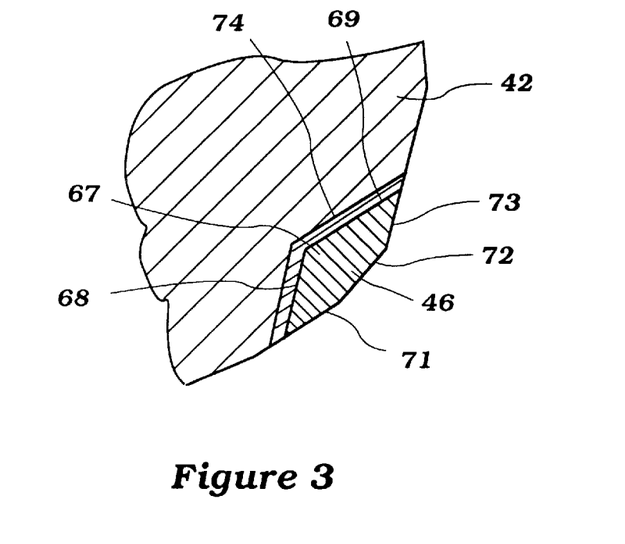
FIG. 3 is an enlarged view of the area encompassed by the circle 3 in FIG. 2, and shows the valve seat insert.

FIG. 3 is an enlarged cross-sectional view taken through one of the intake valve seats 46 and illustrates how the valve seats appear in somewhat of a metallurgical-type cross-section. It should be seen that each valve seat 46 is formed from an insert ring, indicated generally by the reference numeral 67 which is bonded in place into the basic cylinder head material 42 by a technique that will be described. These insert rings 67 are formed preferably from a sintered iron or other ferrous sintered material. This material is chosen because of its high strength and high wear resistance.

The solidus temperature of this material may be as high as 1080° C. with an even higher melting point. It also has a phase change which will occur at a temperature at about 838.3° C. The significance of this will be as described later.

It has been noted that the base cylinder head material 42 is formed from aluminum or an aluminum alloy. These alloys may be of the type aforenoted, i.e., JIS AC4C, AC4B or AC2B. These materials have substantially lower melting points than that of the insert ring 67 and have solidus temperatures respectively of 555° C., 520° C. and 520° C. Again, the significance of this will be as described later.

As will be described, the insert ring 67 has an outer peripheral surface defined by a pair of angularly inclined portions 68 and 69 which meet along a line. The inner surface thereof when final machine is formed of three angularly inclined portions 71, 72 and 73, the shape of which may be dictated only by the desired configuration of the valve seating surface and flow passage going thereto. Because of this invention, the seating areas of the insert ring 67 which form the valve seat 46 may extend for a distance only slightly greater than the seating surface of the associated valve.

Although only a metallurgical bond is formed at the interface between the insert ring 67 and the base cylinder head material 42, there is formed a work hardened area, indicated at 74 in the base cylinder head material 42. This work hardened area 74 is formed in a manner which will also be described. Although the area is work hardened, its metallurgical content is not any different from the base cylinder head material 42. As a result, there is no actual alloy that occurs with the material of the insert ring 67 and, thus, a good sound joint is formed without any voids and gaps, and also without changing the basic metallurgical characteristics of either material.

Figure 4:
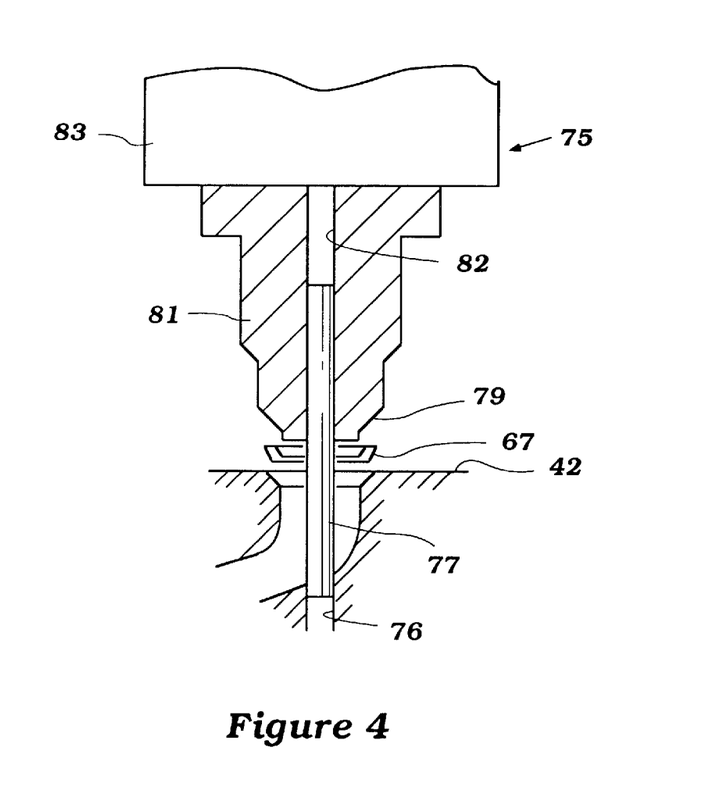
FIG. 4 is a cross-sectional view showing an apparatus for practicing the invention in a state immediately prior to the formation of the valve seat.

In order to form the bond between the insert ring 67 and the base cylinder head material 42, an apparatus shown in FIG. 4 and identified by the reference numeral 75 is employed. This type of apparatus is described in more detail in co-pending application Ser. No. 08/636011, Filed Apr. 22, 1996 and assigned to the assignee hereof. Basically, the apparatus 75 is of a type normally utilized for welding, but may also be used for applying a lesser amount of heat than used in welding and also for applying pressure to the components.

As may be seen in FIG. 4, the base cylinder material 42 is formed with a bore 76 in which the valve guides 49 and 61 of the intake and exhaust valves 48 and 59, respectively, are positioned. A guide post 77 is positioned in this bore 76 and extends through the passage opening of the respective exhaust or intake passages.

The insert rings 67 are placed around this guide post 77 and have a surface, indicated at 78 in FIGS. 5–9, which is complementary to and engaged with a pressing surface 79 of a pressing mandrel 81. The mandrel 81 has a bore 82 that permits it to be slid over the guide post 77 and guided for its movement thereby. A press element 83 engages the mandrel 81 and urges it along the post 77 to perform the pressing operation which will be shortly described.

The apparatus 75 is also electrically connected so that a polarity is applied to the mandrel 81 and to the base cylinder head material 42 so as to define an electrical path that passes through the mandrel surface 79, the insert ring 67 and the base cylinder head material 42. This electrical current is controlled so that during the pressing operation the temperature of the base cylinder head material 42 does not exceed its solidus temperature. Preferably, the temperature is in a range of temperatures, as will be described by particular reference to FIG. 14, which may extend downwardly from the solidus temperature over a range of 100 or more degrees Celsius (100°). These specific temperatures will be described later by reference FIG. 14.

Figure 5:
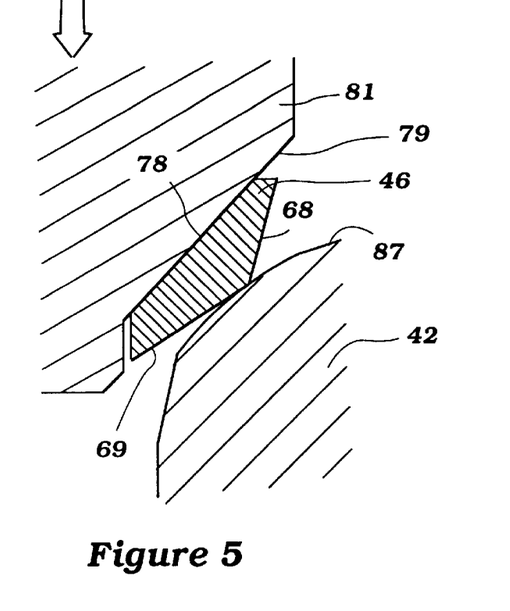
FIG. 5 shows the initial application of pressure.

The actual pressing and bonding operation will now be described by reference to FIGS. 5–11. Referring first to FIG. 5, this shows the configuration of the insert ring 46 so that its external surfaces which has as been noted comprised of a pair of angularly related parts 68 and 69 which meet at a point 86. This point 86 contacts the surface 87 of the base cylinder head material 42 which has appropriately machined cavity to receive the initial contact.

A pressure is then applied to the mandrel 81 so that its surface 79 engages the insert ring surface 78 and begins the pressing operation. It should be noted that the press 83 has configured with it a gage that can measure the degree of sinking of the insert ring 46 into the cylinder head material 42. The rate of sink is also indicative of the bonding temperature that exists and can be utilized to monitor the pressing operation and application of heat so that the solidus temperature of the base cylinder head material 42 is not exceeded.

Figure 6:
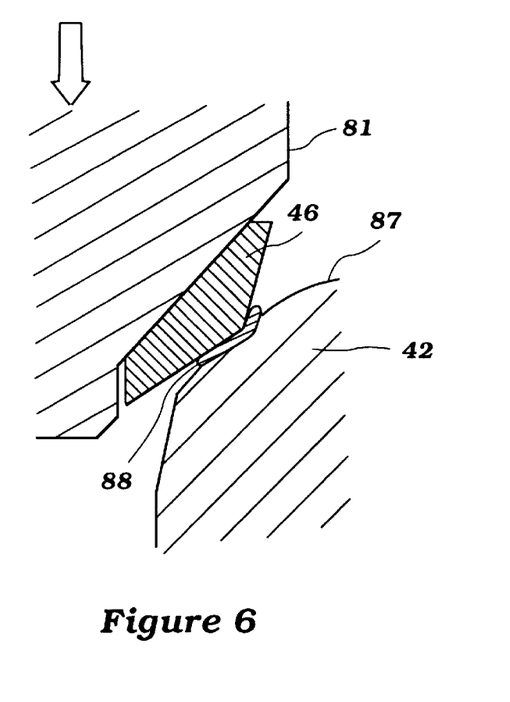
FIG. 6 shows the continued application of pressure and the initial application of heat.

As seen in FIG. 6, when the pressing force is exerted, this will cause a plastic deformation layer 88 to begin to be formed in the base cylinder head material 42. At this time, heat is also applied by the passing of a current through the mandrel 81, insert ring 67 and base cylinder head material 42. During the pressing step, the plastic deformation layer 88 will form extending extruded portions 89 which may contain surface impurities from the aluminum which are extracted during this process.

Figure 7:
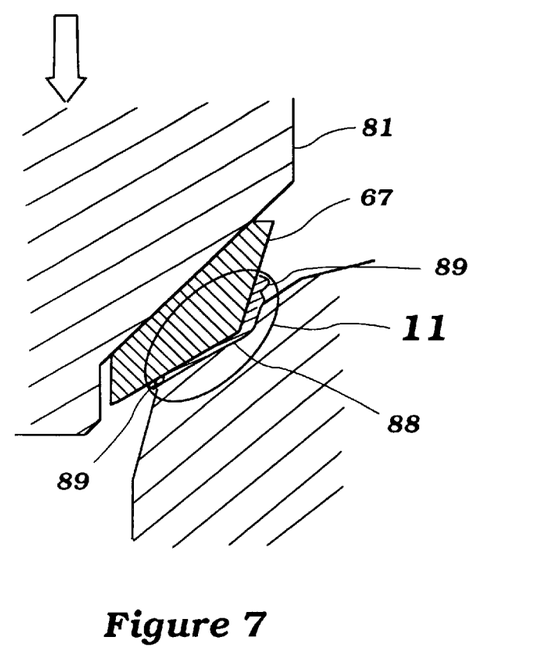
FIG. 7 shows the continued application of pressure and heat and the continued formation of the bond and plastically deformed, work hardened.
Figure 8:
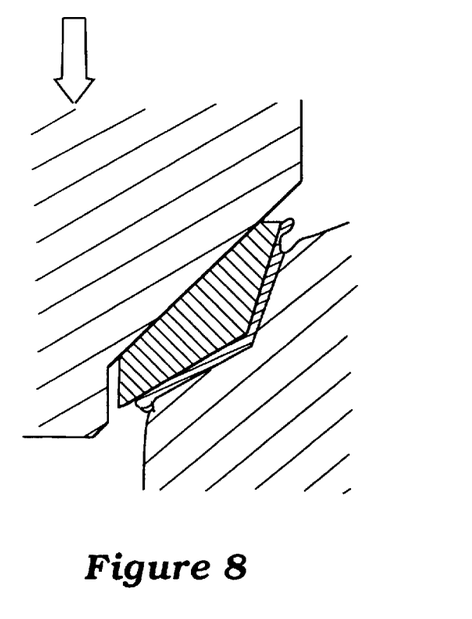
FIG. 8 shows the completion of the heating phase and immediately prior to the discontinuance of the application of pressure.

This pressing operation and the application of heat continues as shown in the step of FIG. 7 so as to cause this extrusion to occur. At some time before the total sink is accomplished, the application of heat is discontinued while the application of pressure is continued. This will be described later by reference to FIGS. 12 and 13. Thus, as shown in FIG. 8, the pressure is still applied as indicated by the arrow, but the application of electrical current for heat is discontinued.

Figure 11:
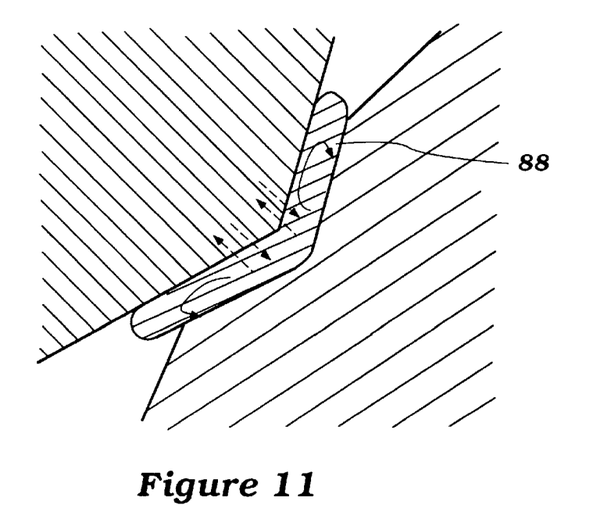
FIG. 11 is an enlarged view of the area encompassed by the circle 11 in FIG. 7, and shows the stage during the bonding technique to explain more fully how the bonding is accomplished.

FIG. 11 shows an enlarged cross-sectional view and indicates how the plastic deformation layer 88 is formed. Actually, the layer 88 is still primarily in a solid, but plastic state so that there will be no real melting of the material. This is because the temperature is maintained below the solidus temperature. Thus, the resulting and remaining material that will bond the insert ring 67 to the cylinder head 42 is basically the same material as the cylinder head body 42, but it is only work hardened. Again, this will be described by reference to FIG. 16.

Figure 9:
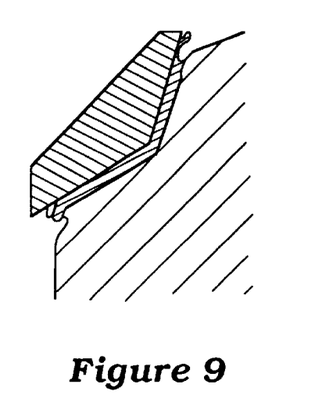
FIG. 9 shows the final joint as removed from the pressing apparatus.
Figure 10:
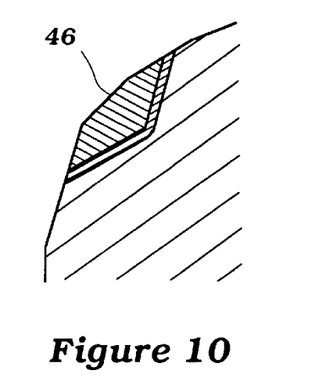
FIG. 10 shows the final machined valve seat.

FIG. 9 shows the appearance at the finish of the bonding step when the mandrel 81 and guide post 77 are removed. The cylinder head is then machined in a conventional fashion so as to form the resulting valve seat 46 as seen in FIG. 10 with only the work hardened plastic deformation area 74 remaining which is the result of the area referred to as the plastic deformation layer 88. The impurities which may have been extruded at the area shown at 89 in FIG. 7 are removed by the finish machining process so that a metallurgically pure joint will result.

Figure 12:
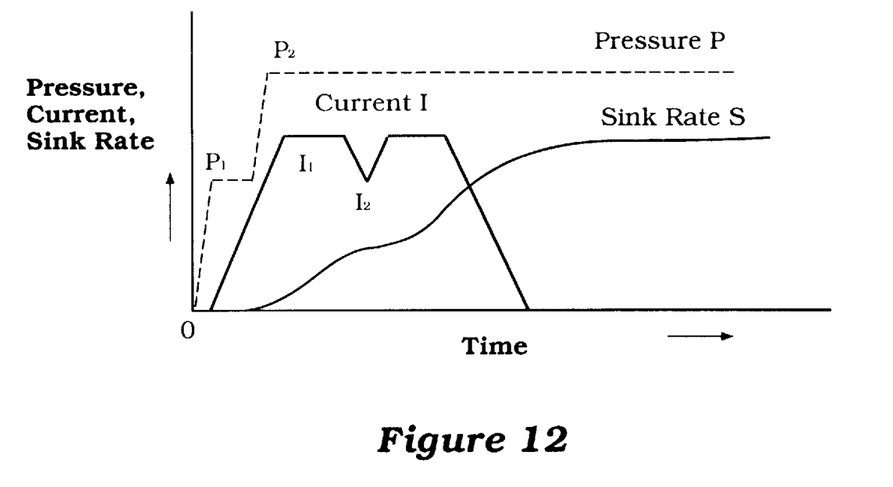
FIG. 12 is a graphical view showing the application of pressing force, the imposition of electrical energy for heating, and the sinking rate of the insert into the base cylinder head material in accordance with one heating and pressure method.

FIG. 12 shows one type of technique that can be employed for changing the pressure and the current during the bonding technique. As may be seen in this figure the pressure P is built up to a first lower level pressure $P_1$ at a time about when the electrical current is built up along a sloped line to a point I1. During the buildup of electrical current, the pressure is increased at an appropriate time to a higher pressure $P_2$ also along a sloped line and this pressure is maintained.

As may be seen from the sink rate S, the rate of sinking of the insert will accelerate and at a time when it is accelerating the current may be dropped to a lower value I2 so as to insure that the heat will not exceed the solidest temperature of the base aluminum alloy forming the cylinder head body 42. The current may again be built up at a later time and then gradually decayed when the sink rate is continuing to increase. The pressure is held at the pressing $P_2$ for this time. The pressure is continued after the electrical current flow has stopped as previously noted for a brief period of time.

Figure 13:
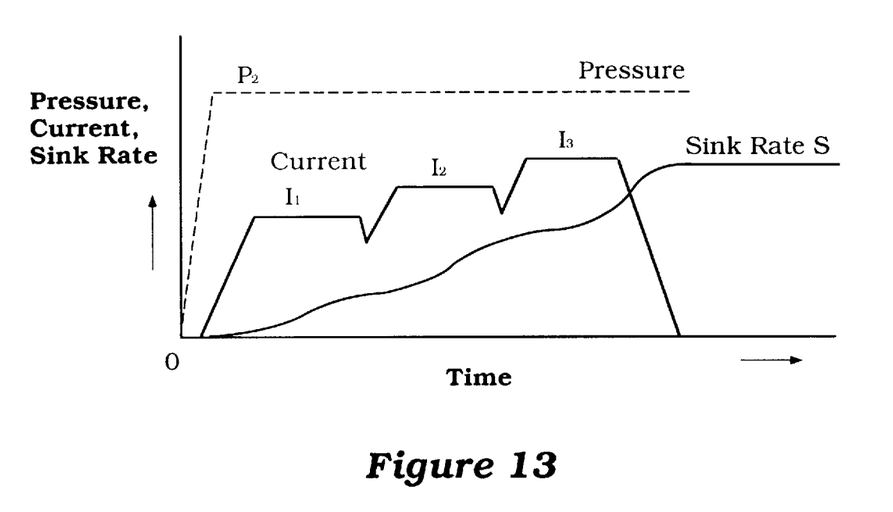
FIG. 13 is a graphical view showing the same parameters as FIG. 12, but shows a different technique.

FIG. 13 shows another technique that may be employed and this utilizes increasing the electrical current in three steps to a first level I1, a second higher level I2 and a third still highest level I3. Between the shift from the levels I1–I2 and I2–I3, there is a decrease that is initiated so as to avoid the generation of too high a temperature that might exceed the solidest temperature of base cylinder head material.

With this technique, the pressure is built up to a pressure $P_2$ in a single stage and beginning before current is imposed and completing to the maximum pressure $P_2$ at some time during the initial buildup of the current flow to the value I1. Again, this is done so as to ensure against exceeding the solidest temperature of the base cylinder head material 42.

Figure 14:
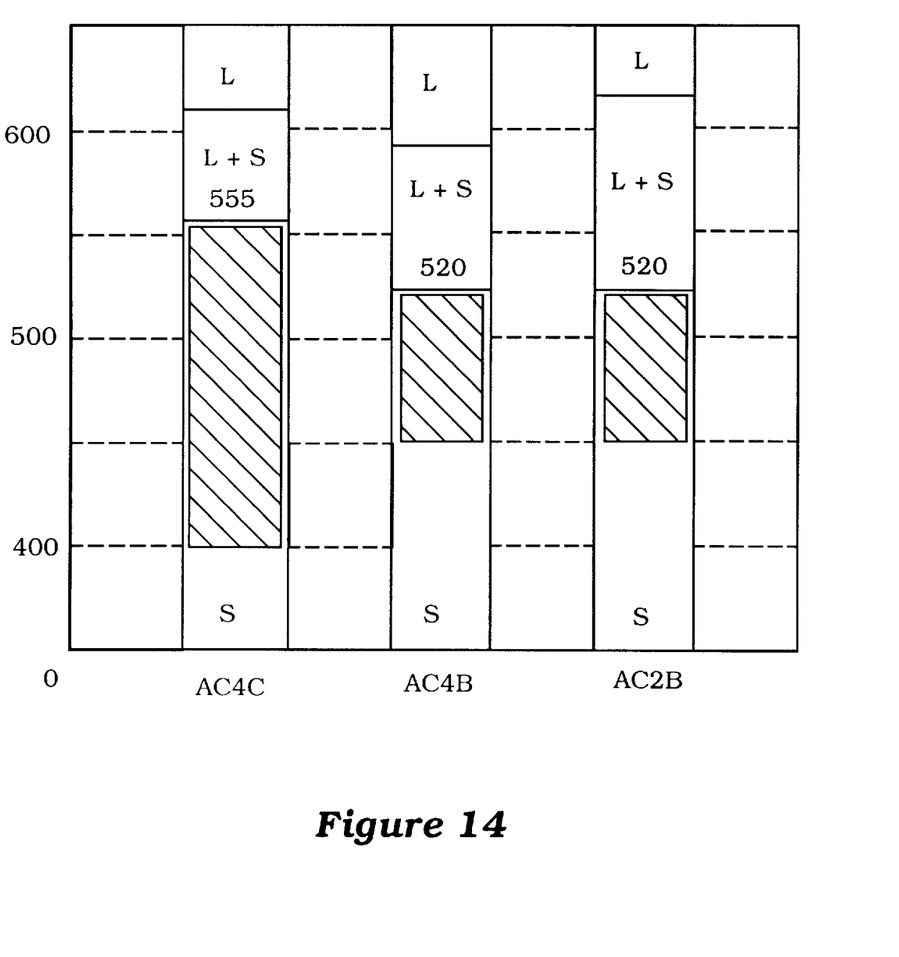
FIG. 14 is a view showing the different cylinder head materials, their melting temperatures and the temperatures at which the components are heated during the bonding technique.

The temperature relationships for the three exemplary materials are shown in FIG. 14 wherein the solidus temperature and melting point are shown for each of the three exemplary materials (AC4C, AC4B and AC2B). The shaded areas shows the temperature employed during the actual bonding technique.

Figure 18:
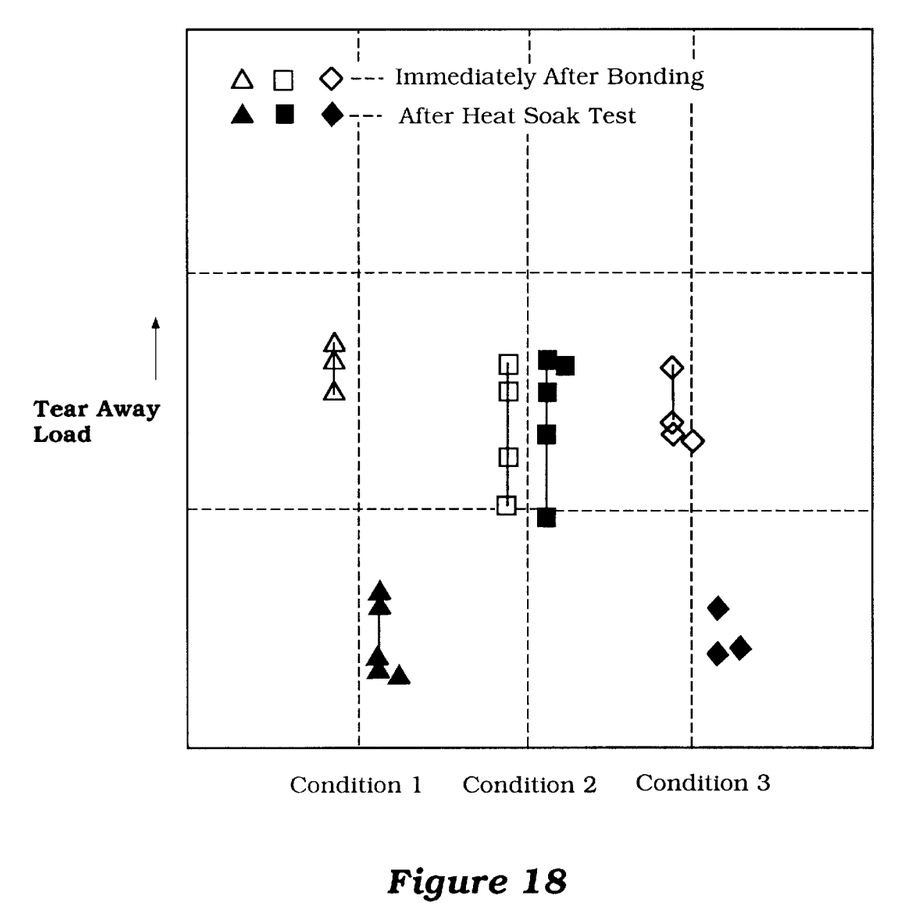
FIG. 18 is a graphical view showing the breakaway strength of resulting joints formed with certain techniques, both before and after subjecting of the bonded joint to a high temperature soak cycle, to show how the technique embodying the invention results in an improved joint that has high heat resistance.

It will be seen that in each instance the temperature does not exceed the respective solidus temperatures 555° C. and 520° C. In the case of the AC4C material, the temperature during the bonding technique ranges from 400° C. up to just under 555°, i.e., 555° C. With the materials AC4B and AC2B, the temperature range is from 450° to about 515° or slightly under the respective solidus temperatures of 520°. In this way, it is ensured that the resulting bond will have great strength and also will have high temperature resistance, as will be the described in conjunction with FIG. 18.

It has been previously noted that the solidus temperature of the ferrous material is approximately 1,080° C. and hence, there is a difference between the solidus temperatures of the two materials of at least 340°.

In addition to the desirability of maintaining the temperature of the base cylinder head material 42 below its solidus temperature and the maintaining of the insert ring material of the insert ring 67 below its solidus temperature, it is also desirable to maintain the temperature of the insert ring 67 such that its crystal structure does not significantly change due to a phase transformation.

Figure 15:
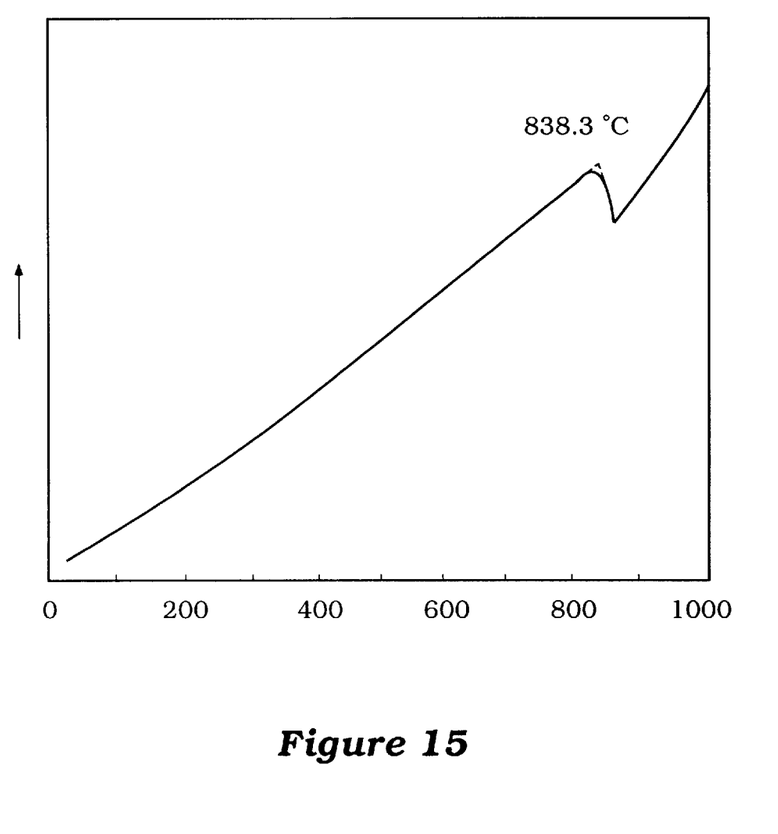
FIG. 15 is a graphical view showing the phase characteristics of the basic cylinder head material.

FIG. 15 is a curve that shows the Thermo Mechanical Analysis (TMA) in configuration of the insert ring material 76 as the temperature increases. It will be seen that the curve rises as the temperature increases but at a temperature of about 838.3° C. this curve has a sharp dip. This is due to the phase transformation that takes place at this temperature. Thus, it is important to ensure that the temperature of the insert ring 67 does not exceed this temperature during the bonding process.

Figure 16:
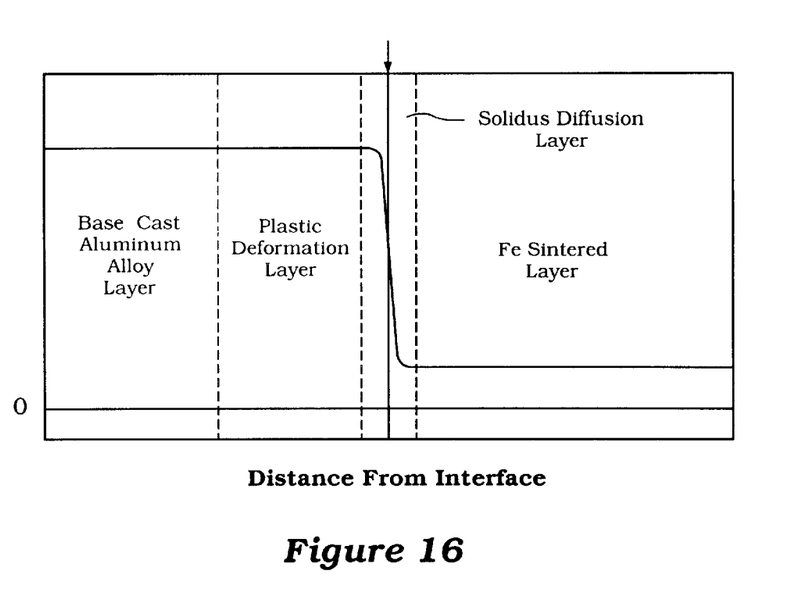
FIG. 16 is a graphical view taken through the finished joint and showing the different material characteristics therein.

FIG. 16 is an enlarged view which shows the basic material across the transition in proximity to the bonding layer. In the base cylinder head cast material, the aluminum alloy is basically the same constituency and has no mixing with the ferrous material up to the area closely adjoining the bonding surface where the plastic deformation layer is formed. However, there is the plastic deformation area that extends further outwardly and this is the area where the aluminum alloy experiences some work hardening. In the area adjacent the bonding surface, there is a very thin fusion layer in which on the aluminum alloy side consists primarily of aluminum alloy and on the insert ring ferrous sintered material side is primarily of ferrous sintered material. There is no work hardening or change in physical structure of the remainder of the insert ring ferrous sintered material.

Figure 17:
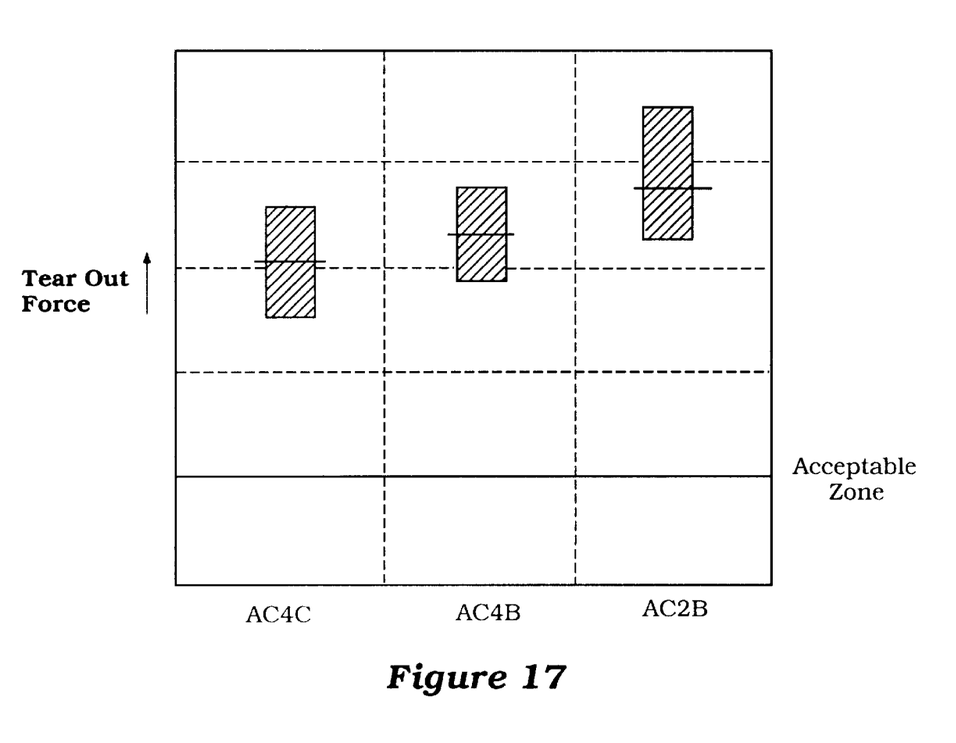
FIG. 17 is a graphical view showing different cylinder head materials, like those shown in FIG. 14, and depicts the bonding strength thereof.

If this procedure is followed and the solidus temperature of the base cylinder head material is not exceeded then the resulting joint has a high strength and resists separational forces placed on the insert ring in attempting to pull it out of the cylinder head material. These forces of tearout are shown in FIG. 17 for various materials with the range showing the range of resulting strengths depending upon the actual temperatures and pressures employed. It will be seen that each joint ends up substantially stronger than the acceptable level.

Finally, the effect of this construction also improves ability of the insert ring to be held in place after subjection to long heat intervals as exist when running. An important characteristic of utilization of this process is that the strength of the joint does not deteriorate significantly after subjecting the joint to a heat soak condition.

FIG. 13 shows three different types of bonding processes with the center condition 2 constituting that practicing the invention. Conditions 1 and 3 show situations where the solidus temperature may be exceeded or the pressing temperature and pressure curve may vary in such a way as to result different bonds. As may be seen with each technique as shown in the open examples the bond is quite strong after initially formed and before the joint has been subjected to any heat load. In fact, the joint strength is approximately the same for each method. The cross-sectional shapes of triangle square or diamond represent the particular specific materials described.

However, it will be seen that if the joint is subjected to temperature of 300° C. for an elongated time period such as 24 hours, to simulate actual engine running conditions for a long period of time, the methodology not practicing the invention results in a substantial reduction in the bond strength. With this method, however, the bond strength after does not significantly vary in strength. Therefore, this invention provides not only a good initial bond but one which will maintain its strength during elongated periods of engine running.

In the illustrated embodiments, the insert ring has been formed from a harder more wear resistant material such as a ferrous material. This same technique can also be employed where the insert ring is formed from a lightweight alloy and these two are bonded. However, the invention has particular utility where, as noted, there is a substantial difference between the solidus temperatures of the insert ring and the base material to which it is joined.

Of course, the foregoing description is that of preferred embodiments of the invention, and various changes and modifications may be made without departing from the spirit and scope of the invention, as defined by the appended claims.

What is claimed is:

1. A cylinder head for an internal combustion engine comprised of a cylinder head casting formed from a first metal and having a flow passage extending therethrough from a valve seat area and a valve seat insert metallurgically bonded to said valve seat area, said valve seat insert being formed from a second metal, said metals having substantially different melting temperatures, the metallurgical bonding being accomplished by the steps of applying pressure and heat to the two metals to force them into engagement, the process being performed so that the temperature of the metals does not exceed the solidus temperature of the metal having the lower melting point.

2. A cylinder head for an internal combustion engine as set forth in claim 1, wherein the metal of the lower melting point is placed in a state of plastic deformation so as to work harden the metal without affecting any substantial alloying between the two metals.

3. A cylinder head for an internal combustion engine as set forth in claim 2, wherein the temperature of the metal having the lower melting point during the bonding process is maintained in a temperature range that is less than the solidus temperature but close to the solidus temperature.

4. A cylinder head for an internal combustion engine as set forth in claim 3, wherein the temperature of the metal having the higher melting point is maintained so as to not exceed the phase transformation temperature of the metal.

\* \* \* \* \*